US009703039B2

(12) United States Patent
Pan et al.

(10) Patent No.: US 9,703,039 B2
(45) Date of Patent: Jul. 11, 2017

(54) EDGE COUPLING DEVICE FABRICATION

(71) Applicant: Futurewei Technologies, Inc., Plano, TX (US)

(72) Inventors: Huapu Pan, San Jose, CA (US); Zongrong Liu, Pleasanton, CA (US); Hongzhen Wei, Pleasanton, CA (US); Hongmin Chen, Davis, CA (US)

(73) Assignee: Futurewei Technologies, Inc., Plano, TX (US)

( * ) Notice: Subject to any disclaimer, the term of this patent is extended or adjusted under 35 U.S.C. 154(b) by 10 days.

(21) Appl. No.: 14/680,917

(22) Filed: Apr. 7, 2015

(65) Prior Publication Data

US 2015/0293303 A1  Oct. 15, 2015

Related U.S. Application Data

(60) Provisional application No. 61/977,366, filed on Apr. 9, 2014.

(51) Int. Cl.
*G02B 6/12* (2006.01)
*G02B 6/136* (2006.01)
*G02B 6/132* (2006.01)
*G02B 6/30* (2006.01)
*G02B 6/122* (2006.01)

(52) U.S. Cl.
CPC ............ *G02B 6/136* (2013.01); *G02B 6/1223* (2013.01); *G02B 6/132* (2013.01); *G02B 6/305* (2013.01); *G02B 2006/12061* (2013.01); *G02B 2006/12097* (2013.01); *G02B 2006/12195* (2013.01)

(58) Field of Classification Search
CPC ...... H01L 2924/00; H01L 2924/00014; G02B 6/43; G02B 6/4214; G02B 6/12004; G02B 6/122; G02B 6/132; G02B 6/12
See application file for complete search history.

(56) References Cited

U.S. PATENT DOCUMENTS

| 7,738,753 | B2 | 6/2010 | Assefa et al. |
| 2005/0123244 | A1 | 6/2005 | Block et al. |
| 2008/0290066 | A1 | 11/2008 | Li et al. |
| 2011/0188530 | A1* | 8/2011 | Lell ...................... H01S 5/0078 372/49.01 |
| 2013/0265624 | A1* | 10/2013 | Zheng .................... G02B 6/122 359/15 |

OTHER PUBLICATIONS

Kopp, et al., "Silicon Photonic Circuits: On-CMOS Integration, Fiber Optical Coupling, and Packaging," IEEE Journal of Selected Topics in Quantum Electronics, 2010, 12 pages.
Foreign Communication From a Counterpart Application, PCT Application No. PCT/US2015/024765, International Search Report dated Jun. 17, 2015, 4 pages.
Foreign Communication From a Counterpart Application, PCT Application No. PCT/US2015/024765, Written Opinion dated Jun. 17, 2015, 6 pages.

* cited by examiner

*Primary Examiner* — Jennifer Doan
(74) *Attorney, Agent, or Firm* — Conley Rose, P.C.

(57) ABSTRACT

A method of fabricating an edge coupling device and an edge coupling device are provided. The method includes removing a portion of cladding material to form a trench over an inversely tapered silicon waveguide, depositing a material having a refractive index greater than silicon dioxide over remaining portions of the cladding material and in the trench, and removing a portion of the material within the trench to form a ridge waveguide.

17 Claims, 10 Drawing Sheets

EDGE COUPLING DEVICE FABRICATION

CROSS-REFERENCE TO RELATED APPLICATIONS

This patent application claims the benefit of U.S. Provisional Patent Application No. 61/977,366, filed Apr. 9, 2014, by Huapu Pan, et al., and titled "Edge Coupling Fabrication," the teachings and disclosure of which are hereby incorporated in their entireties by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In optical transceivers, it is desirable to integrate as many photonic components in one chip as possible. As integration density increases and the sizes of photonic components shrink, however, it is increasingly difficult to integrate the photonic integrated circuit (PIC) with other optical components such as fibers because the mode size in the waveguide of the PIC shrinks correspondingly. For example, the mode size of a typical 450 nanometer (nm)×220 nm wave-guide in a silicon photonic based PIC is roughly the size of the waveguide itself, but the mode size (e.g., mode field diameter) of a standard single mode fiber is as large as 9.2 micrometers ($\mu$m). Thus, the mode size of the waveguide on the PIC is much smaller than the mode size of the fiber.

Lenses may be used to reduce the mode size of the fiber to correspond to the mode size of the waveguide of the PIC. However, packaging the PIC with lens and fiber is challenging due to the limited alignment tolerance if the mode size at the interface of the PIC is too small.

A mode converter may, for an edge coupled PIC, be used to enlarge the mode size of the waveguide of the PIC. However, the mode converter should be able to be integrated with other components on the PIC as well.

SUMMARY

In one embodiment, the disclosure includes a method of fabricating an edge coupling device. The method includes removing a portion of cladding material to form a trench over an inversely tapered silicon waveguide, depositing a material having a refractive index greater than silicon dioxide over remaining portions of the cladding material and in the trench, and removing a portion of the material within the trench to form a ridge waveguide In one embodiment, the disclosure includes a method of fabricating an edge coupling device. The method includes forming a trench within a cladding material disposed over an inversely tapered silicon waveguide, depositing a refractive index material within the trench, wherein the refractive index material has a refractive index between 1.445 and 3.5, and patterning the refractive index material to form a ridge waveguide within the trench.

In another embodiment, the disclosure includes edge coupling device. The edge coupling device includes a substrate, a buried oxide disposed over the substrate, a cladding material disposed over the buried oxide, wherein the cladding material includes a trench, an inversely tapered silicon waveguide disposed within the cladding material beneath the trench, and a ridge waveguide disposed within the trench, wherein the ridge waveguide and the inversely tapered silicon waveguide are vertically-aligned with each other.

DETAILED DESCRIPTION

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
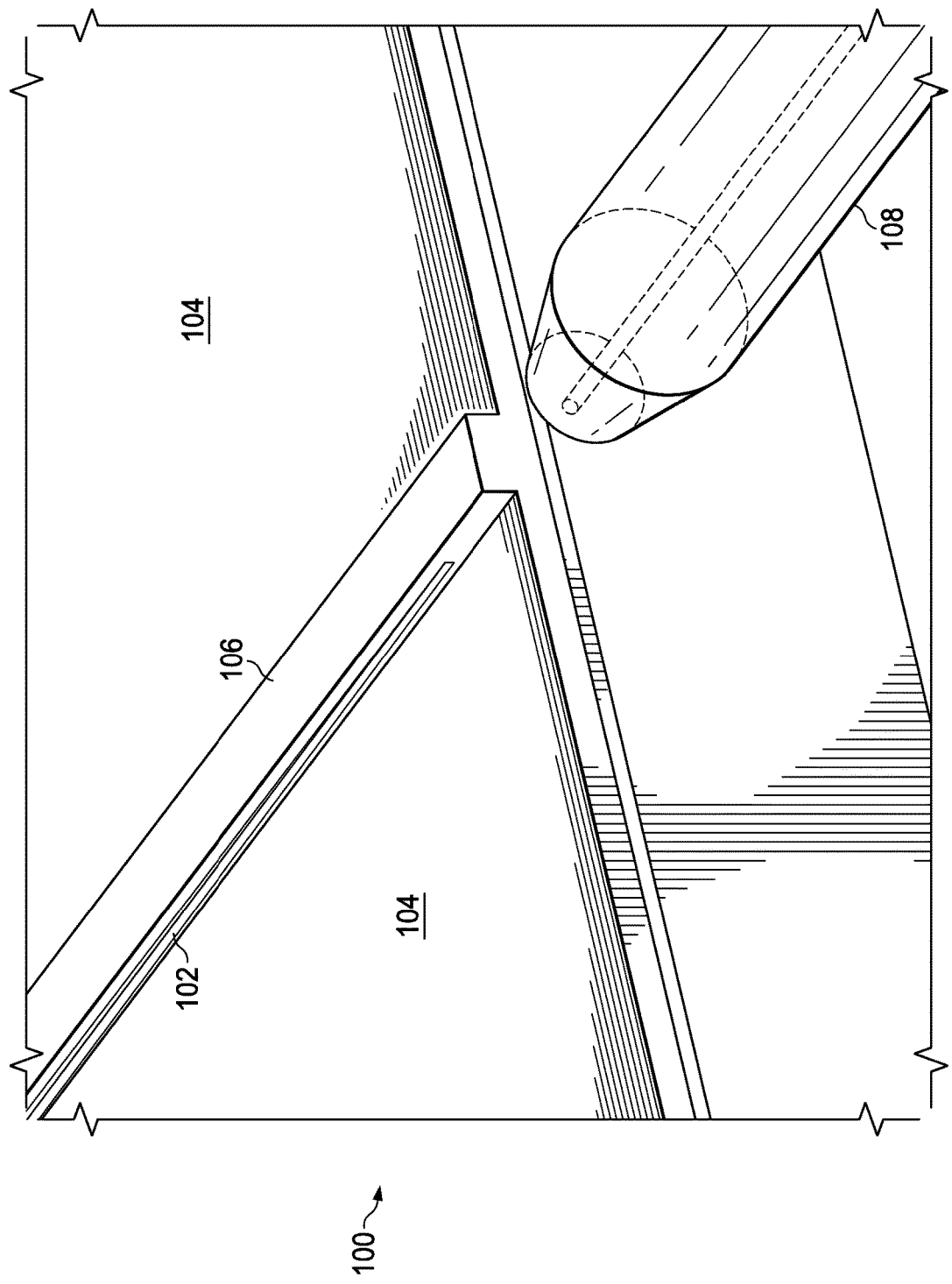
FIG. 1 is a schematic diagram of an edge coupling device.

FIG. 1 is a schematic diagram of an edge coupling device 100 similar to that described in C. Kopp, et al., "Silicon Photonic Circuits: On-CMOS Integration, Fiber Optical Coupling, and Packaging," Institute of Electrical and Electronics Engineers (IEEE) Journal of Selected Topics in Quantum Electronics, 2010 (Kopp), which is incorporated by reference. The edge coupling device 100 is fabricated by covering an inverse-tapered single silicon waveguide 102 (e.g., silicon wire) on a silicon-on-insulator (SOI) wafer 104 with a silicon-rich oxide (SiOx). The SiOx is then partially etched to form a rib waveguide 106 whose refractive index is around 1.6. The mode size of the rib waveguide 106 is compatible for a coupling with a high-performance lensed fiber 108. However, the edge coupling device 100 is not integrated with any other photonic components, and there is no cladding material over the inverse-tapered single silicon wire 102 other than the SiOx waveguide 106.

Figure 2:
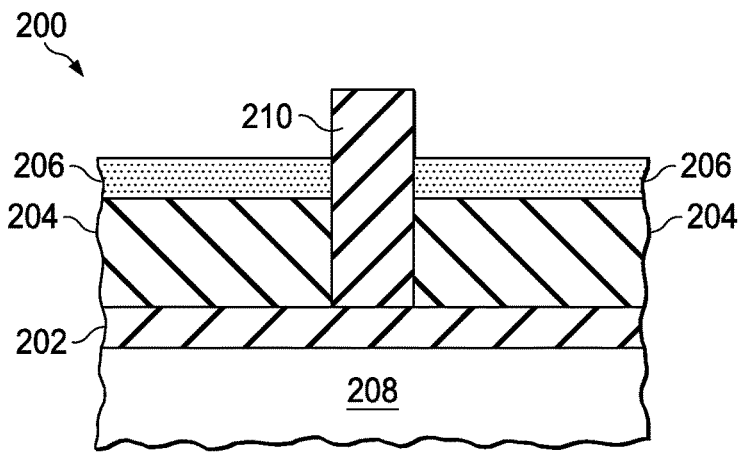
FIG. 2 is a schematic diagram of another edge coupling device.

FIG. 2 is a schematic diagram of another edge coupling device 200 similar to that described in U.S. Pat. No. 7,738,753 entitled "CMOS Compatible Integrated Dielectric Optical Waveguide Coupler and Fabrication" to Solomon Assefa, et al., which is incorporated by reference. As shown, the edge coupling device 200 includes a silicon nitride (SiN) layer 202, a silicon dioxide ($SiO_2$) layer 204, and a Diamond Like Carbon (DLC) layer 206 stacked, in order, on top of the semiconductor device 208 having electronic and/or optoelectronic circuits fabricated thereon. A silicon oxynitride (SiON) coupler 210 is disposed within a trench extending through the silicon dioxide layer 204 and the Diamond Like Carbon layer 206 and down to the silicon nitride layer 202. However, the edge coupling device 200 is fabricated without performing an etch process on a high-index material to form a ridge waveguide. The edge coupling device 200 may be integrated with other silicon photonic components, but the edge coupling device 200 is made in the process of making other silicon photonic components and is a part of the cladding material.

Unfortunately, the edge coupling devices 100, 200 of FIGS. 1-2 and other prior approaches suffer from various shortcomings in that inverse taper designs may suffer from limited mode size and difficulty with monolithically integrating the inverse taper designs with other photonic components.

Disclosed herein are embodiments for addressing some of the issues noted above. As will be more fully explained below, the embodiments may provide for fabricating an edge coupling device by firstly removing cladding material on a fabricated silicon photonic wafer, by secondly filling the removed area with high-index material (e.g., material with a higher index than oxide), and thirdly etching the high-index material to form a ridge waveguide. The edge coupling device may comprise an inversely tapered silicon waveguide covered by the high-index material. An optical mode may be transferred gradually from the silicon waveguide to the high-index material ridge waveguide as the width of the silicon waveguide narrows in the inverse taper. The final mode size of the edge coupling device may be mainly dependent on the size of the high-index material ridge waveguide. Fabrication of the edge coupling device does not negatively impact or influence the performance of components already fabricated on the silicon photonic wafer. The disclosed embodiments may provide for a larger mode size (e.g., about 3 µm to 5 µm) than a simple inverse taper, a low coupling loss, an improved reliability compared to a suspended edge coupler because there may be no suspended structure, an improved fabrication tolerance because the minimum inverse taper width may be larger, and monolithic integration with other passive and active SOI components.

Figure 3A:
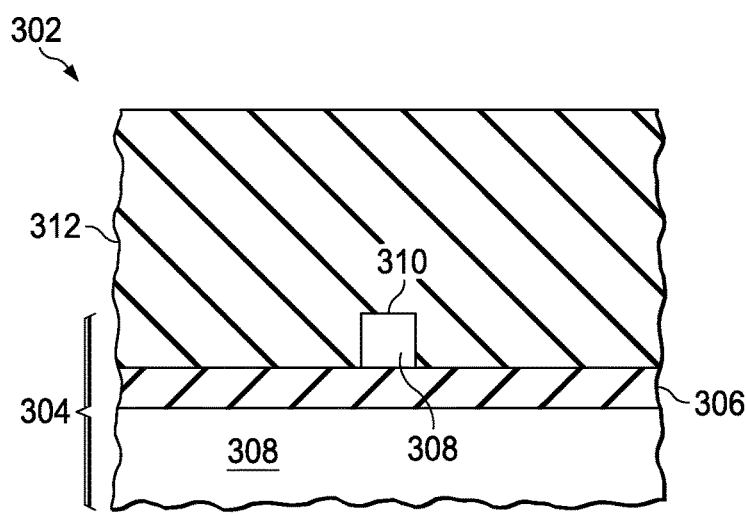
FIGS. 3A-3D collectively illustrate an embodiment of a method of fabricating an edge coupling device.
Figure 3B:
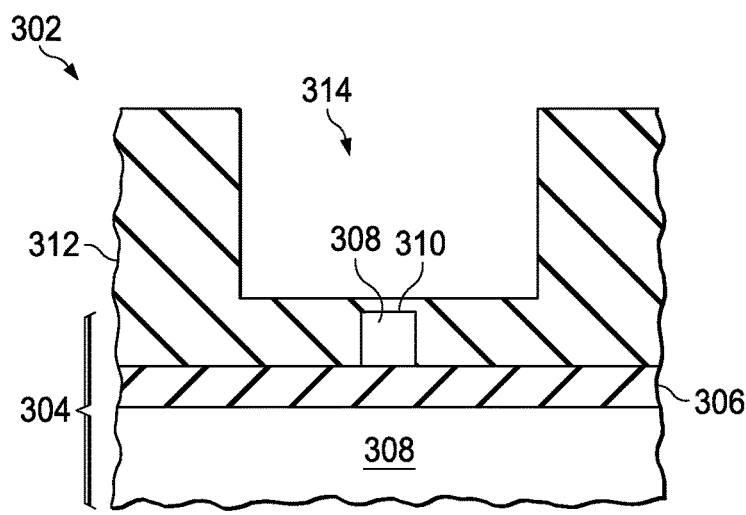
Figure 3C:
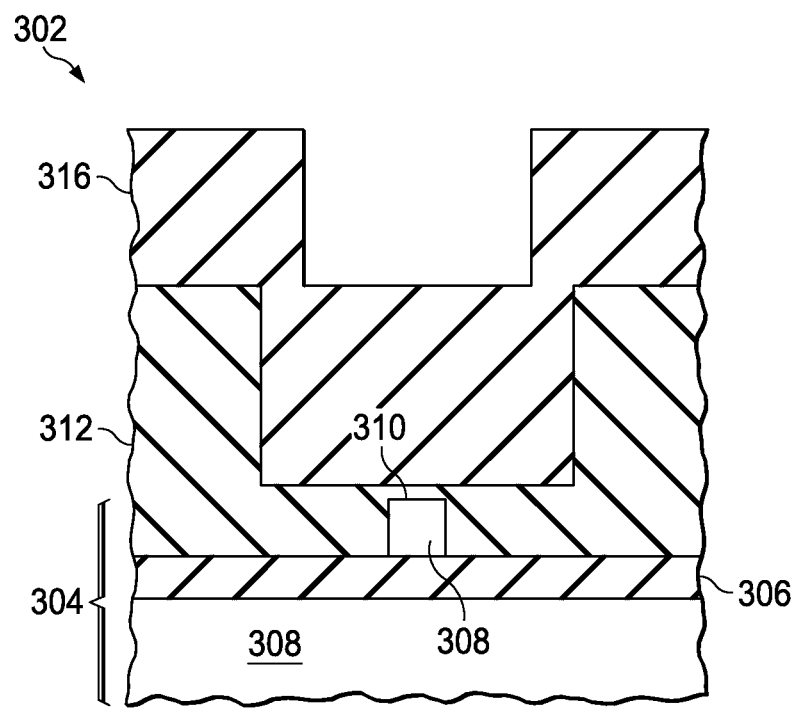
Figure 3D:
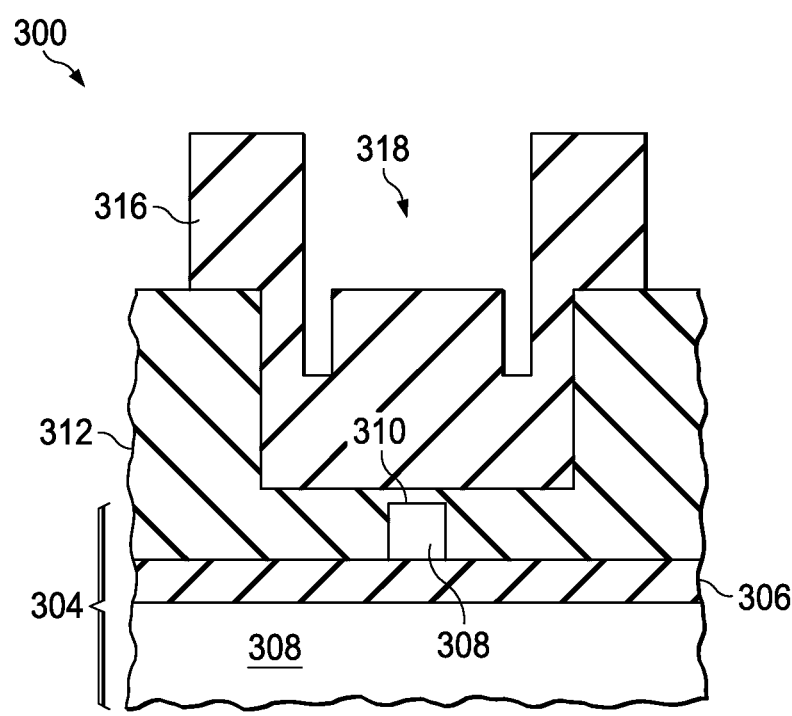

FIGS. 3A-3D collectively illustrate an embodiment of a method of fabricating an edge coupling device 300, the end result of which is depicted in FIG. 3D. As shown in FIG. 3A, a representative portion of a die or integrated circuit wafer 302 is provided. The integrated circuit wafer 302 may include, for example, a PIC or integrated optical circuit. The PIC is a device that integrates multiple (at least two) photonic functions and as such is analogous to an electronic integrated circuit.

In an embodiment, the substrate 304 of the integrated circuit wafer 302 has a SOI structure as shown in FIG. 3A. In the SOI structure, a layered semiconductor-insulator-semiconductor substrate is used place of a semiconductor only substrate in semiconductor manufacturing, especially microelectronics, to reduce parasitic device capacitance, thereby improving performance. In the substrate 304 of FIG. 3A, a buried oxide (BOX) layer 306 is disposed between portions or layers of semiconductor material 308. The buried oxide layer 306 may comprise, for example, silicon dioxide or other suitable oxide. In an embodiment, the buried oxide layer 306 is grown on the underlying semiconductor material 308. The BOX layer 306 may have a thickness ranging from about 1 um to about 3 um, depending on application.

In an embodiment, the semiconductor material 308 is, for example, silicon or a silicon-containing material. Alternatively or additionally, the semiconductor material 308 includes another elementary semiconductor, such as germanium and/or diamond. The semiconductor material 308 may also be a compound semiconductor including silicon carbide, gallium arsenic, gallium phosphide, indium phosphide, indium arsenide, and/or indium antimonide. The semiconductor material 308 may be an alloy semiconductor including silicon-germanium (SiGe), gallium arsenide phosphide (GaAsP), aluminum indium arsenide (AlInAs), aluminum gallium arsenide (AlGaAs), gallium indium arsenide (GaInAs), gallium indium phosphide (GaInP), and/or gallium indium arsenide phosphide (GaInAsP), or combinations thereof. In an embodiment, the semiconductor material 308 comprises a group IV, a group III-V, or a group II-VI semiconductor material.

The semiconductor material 308 may include a doped epitaxial layer, a gradient semiconductor layer, and/or a semiconductor layer overlying another semiconductor layer of a different type, such as a silicon layer on a silicon germanium layer. The semiconductor material 308 may be a p-type or an n-type depending on design requirements of the integrated circuit wafer 302.

As shown in FIG. 3A, a portion of the semiconductor material 308 within the integrated circuit wafer 302 forms an inversely tapered waveguide 310. The inversely tapered waveguide 310 is utilized to propagate an optical signal through the integrated circuit wafer 302. The inversely tapered waveguide 310 has a dimension (e.g., width) that gradually diminishes as the inversely tapered waveguide approaches an edge or coupling junction of the integrated circuit wafer 302. The inversely tapered waveguide 310 may be formed using, for example, deep ultra-violet (DUV) lithography, reactive-ion etching (RIE), or other suitable techniques. The length of the taper in the inversely tapered waveguide 310 may vary depending on application and the mode size desired.

The inversely tapered waveguide 310 may be covered with cladding material 312. In an embodiment, the cladding material 312 is formed from silicon dioxide. In an embodiment, more than 50% of the cladding material 312 is silicon dioxide. The thickness of the cladding material may be, for example, on the order of a few micrometers (µm) (e.g., between about 1 µm and about 3 µm thick). In an embodiment, the cladding material 312 may be formed by stacking layers of silicon dioxide, silicon nitride ($Si_3N_4$), silicon carbide (SiC), or another suitable material. In an embodiment, the cladding material 312 has a refractive index higher than that of oxide (e.g., the buried oxide 306).

As shown in FIG. 3B, a portion of the cladding material 312 covering the inversely tapered waveguide 310 may be removed to form a trench 314. As shown, the trench 314 is disposed over, and vertically aligned with, the inversely tapered waveguide 310. In an embodiment, the trench 314 is formed using a timed etch process. A buffered hydrofluoric acid (BHF) or other suitable etchant may be employed. Using the timed etch process, the cladding material 312 above a top surface of the inversely tapered waveguide 310 is removed. A slight over-etch or under-etch of the cladding material 312 due to inaccurate timing may be acceptable.

After the trench 314 has been formed in the cladding material 312, a high-index material 316 is deposited as shown in FIG. 3C. In other words, the high-index material 316 is deposited where the cladding material 312 has previously been removed. In an embodiment, the high-index material 316 is formed through any of a variety of deposition techniques, including, low-pressure chemical vapor deposition (LPCVD), atmospheric-pressure chemical vapor deposition (APCVD), plasma-enhanced chemical vapor deposition (PECVD), physical vapor deposition (PVD), sputtering, and future-developed deposition procedures.

In an embodiment, the high-index material 316 is deposited until the trench 314 has been at least partially filled. The high-index material 316 has a refractive index larger than the refractive index of silicon dioxide, which is about 1.445, but lower than the refractive index of silicon, which is about 3.5. In an embodiment, the high-index material comprises silicon nitride, silicon oxide, silicon oxynitride, aluminum oxide ($Al_2O_3$), aluminum nitride (AlN), or another suitable material. The thickness of the high-index material 316 may be in the range of 2 μm to 20 μm. The width of the trench 314 (e.g., the cladding removal area) may be greater than 50 μm to ensure the flatness and uniformity of the high-index material above the floor of the trench 314.

As shown in FIG. 3D, a portion of the high-index material 316 is removed to generate a ridge waveguide 318 for the edge coupling device 300. In an embodiment, a photolithography process is utilized to remove the high-index material 316. In other words, the high-index refractive material 316 is patterned to form the ridge waveguide 318. As shown, the ridge waveguide 318 is disposed over, and vertically aligned with, the inversely tapered silicon waveguide 310. In an embodiment, the ridge waveguide 318 is disposed entirely within the trench 314. In another embodiment, a portion of the ridge waveguide 318 protrudes at least partially from the trench 314.

The ridge waveguide 318 is configured to work cooperatively with the inversely tapered silicon waveguide 310 to propagate the optical signal through the edge coupling device 300. For example, the optical mode from the inversely tapered silicon waveguide 310 is gradually transferred to the ridge waveguide 318 as the width of the inversely tapered silicon waveguide 310 narrows. The mode size of the edge coupling device 300 is mainly dependent upon the mode size of the ridge waveguide 318. In an embodiment, the mode size of the ridge waveguide 318 and/or the edge coupling device 300 is between about 3 μm and about 10 μm, which provides for a low coupling loss. In an embodiment, the etch depth forming the ridge waveguide 318 is as deep as possible while still ensuring a single-mode condition of the ridge waveguide 318. The ridge waveguide 318 of the edge coupling device 300 is monolithically integrated with the substrate 304.

Figure 4A:
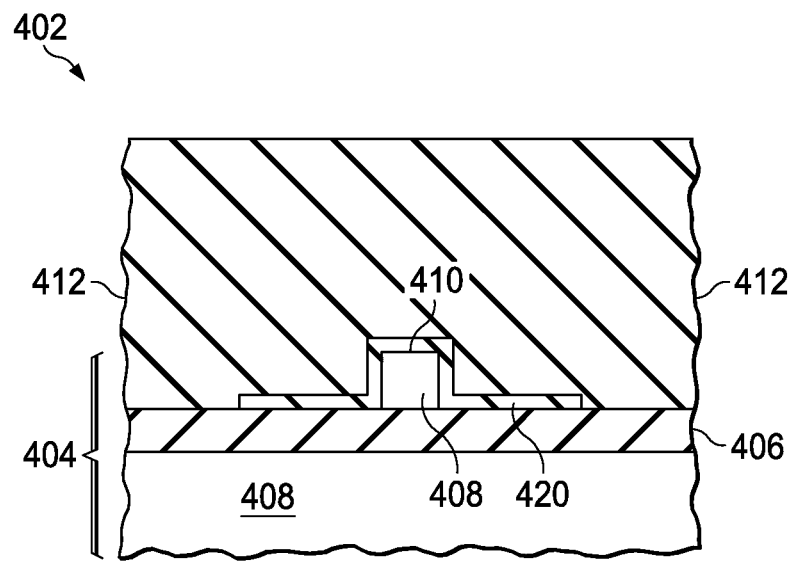
FIGS. 4A-4D collectively illustrate an embodiment of a method of fabricating an edge coupling device.
Figure 4B:
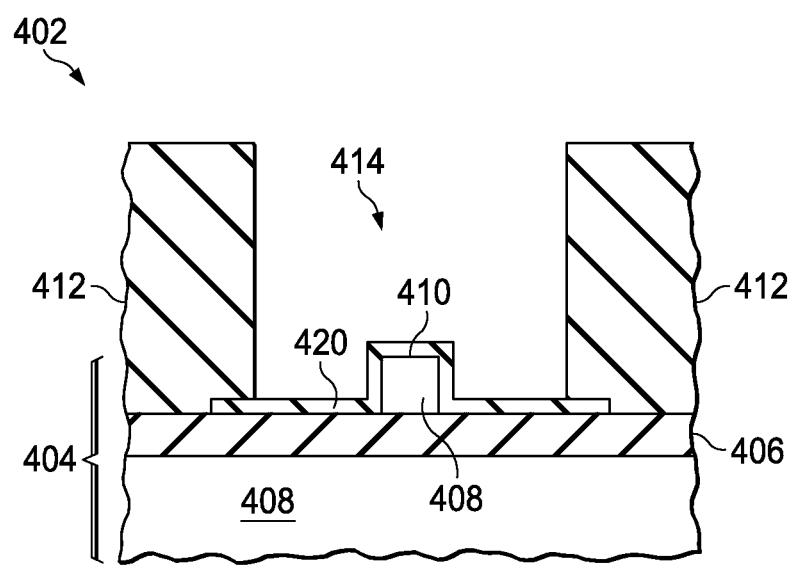
Figure 4C:
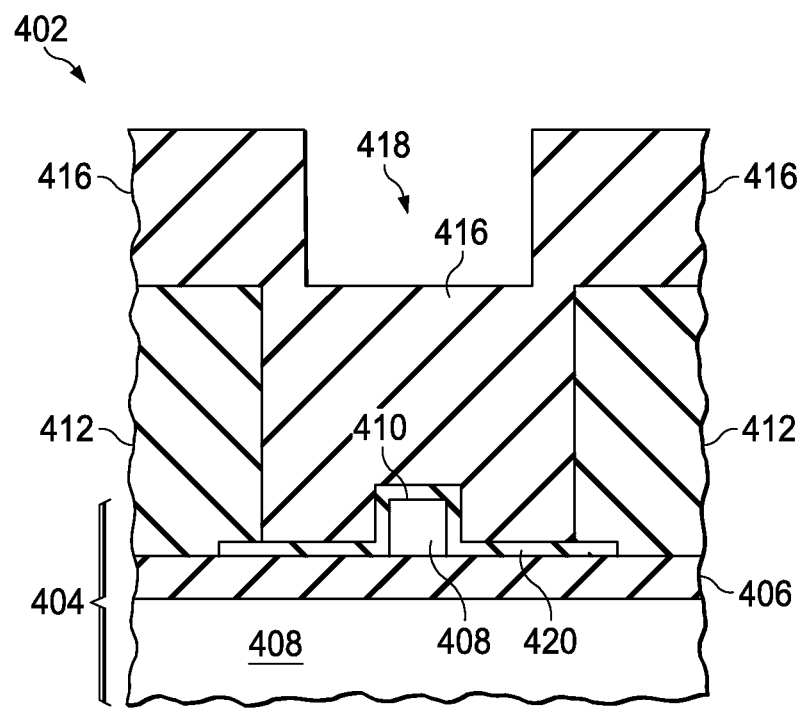
Figure 4D:
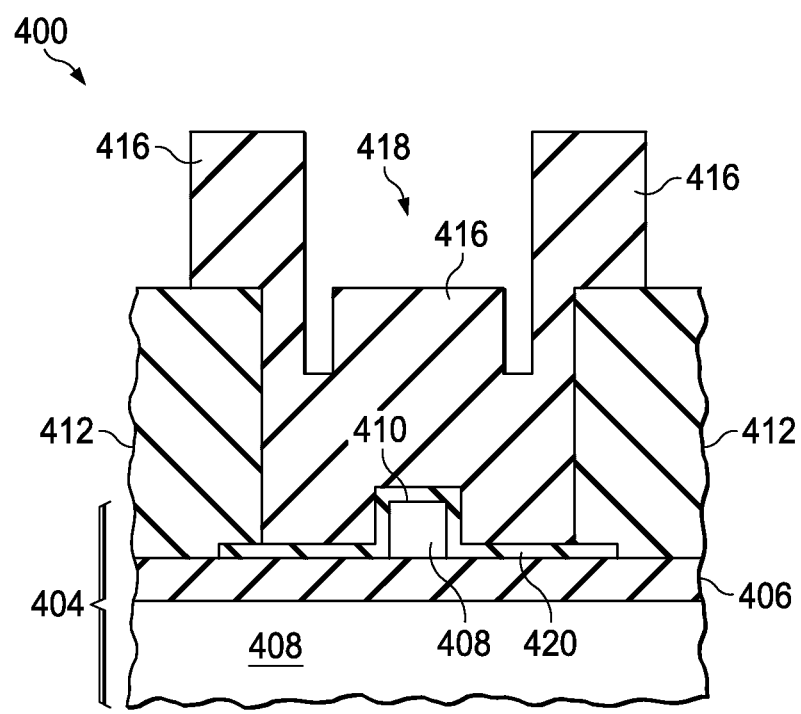

FIGS. 4A-4D collectively illustrate an embodiment of a method of fabricating an edge coupling device 400, the end result of which is depicted in FIG. 4D. The method and corresponding elements 400-418 illustrated in FIGS. 4A-4D are similar to the method and elements 300-318 illustrated in FIGS. 3A-3D. However, in the method depicted in FIGS. 4A-4D an etch stop layer 420 has been included within the wafer 402. The etch stop layer 420 is deposited over the inversely tapered silicon waveguide 410 and a portion of the buried oxide layer 406 to protect those structures from the etchant used to form the trench 414 illustrated in FIG. 4B. In an embodiment, the etch stop layer 420 comprises silicon oxide, silicon nitride, silicon carbide, silicon oxynitride, polysilicon, or combinations thereof. Due to the presence of the etch stop layer 420, etching may be performed until the etch stop layer 420 is reached instead of using a timed etch as described above. In other words, the etch stop layer 420 is used to control the end point during the etching processes. In an embodiment, the etch stop layer 420 is formed through any of a variety of deposition techniques, including, low-pressure chemical vapor deposition, atmospheric-pressure chemical vapor deposition, plasma-enhanced chemical vapor deposition, physical vapor deposition, sputtering, and future-developed deposition procedures. After etching, the high-index material 416 is deposited in the trench 414 and then patterned to form the ridge waveguide 418 as described above.

Figure 5A:
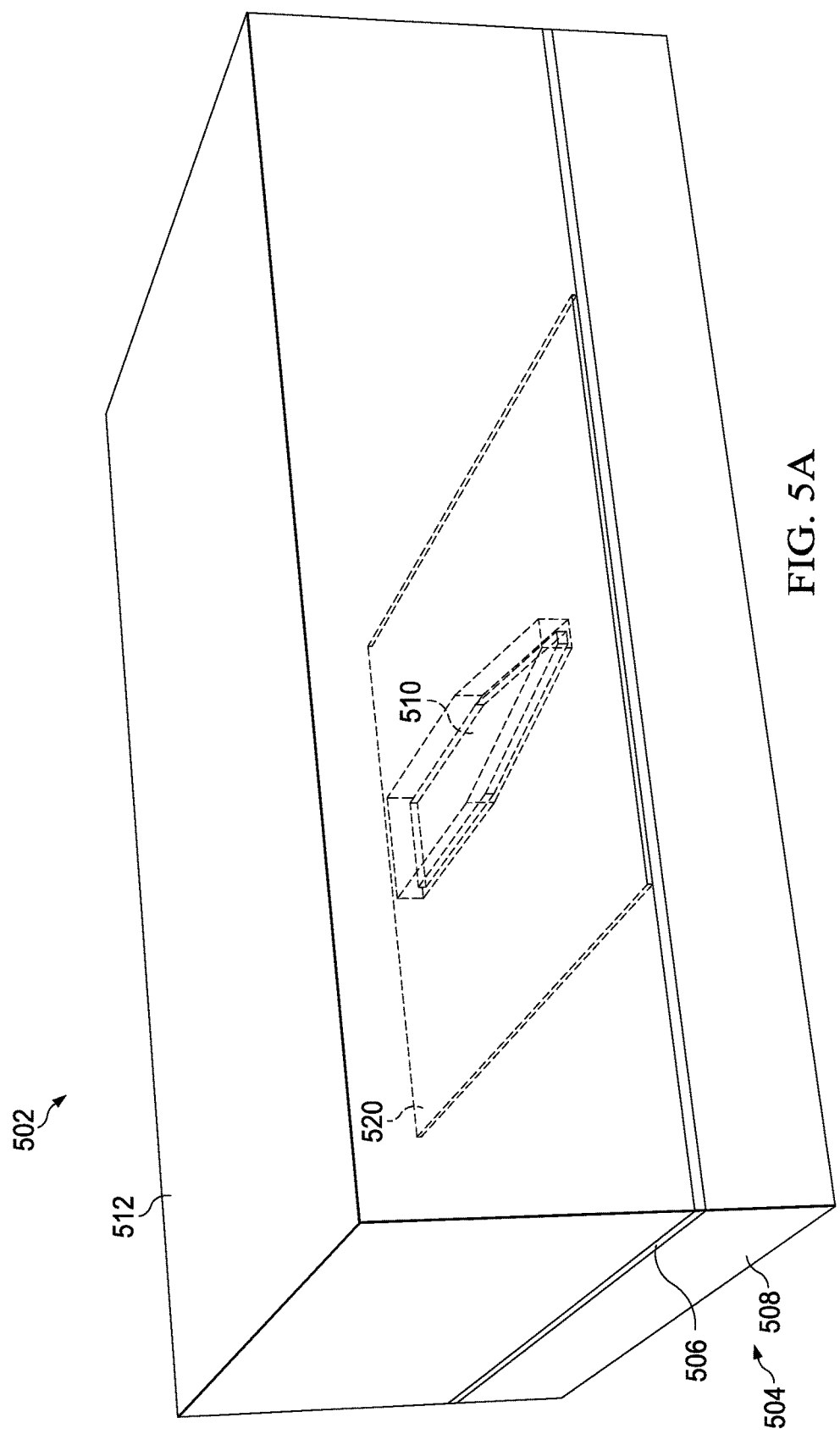
FIGS. 5A-5D collectively illustrate an embodiment of another method of fabricating an edge coupling device.
Figure 5B:
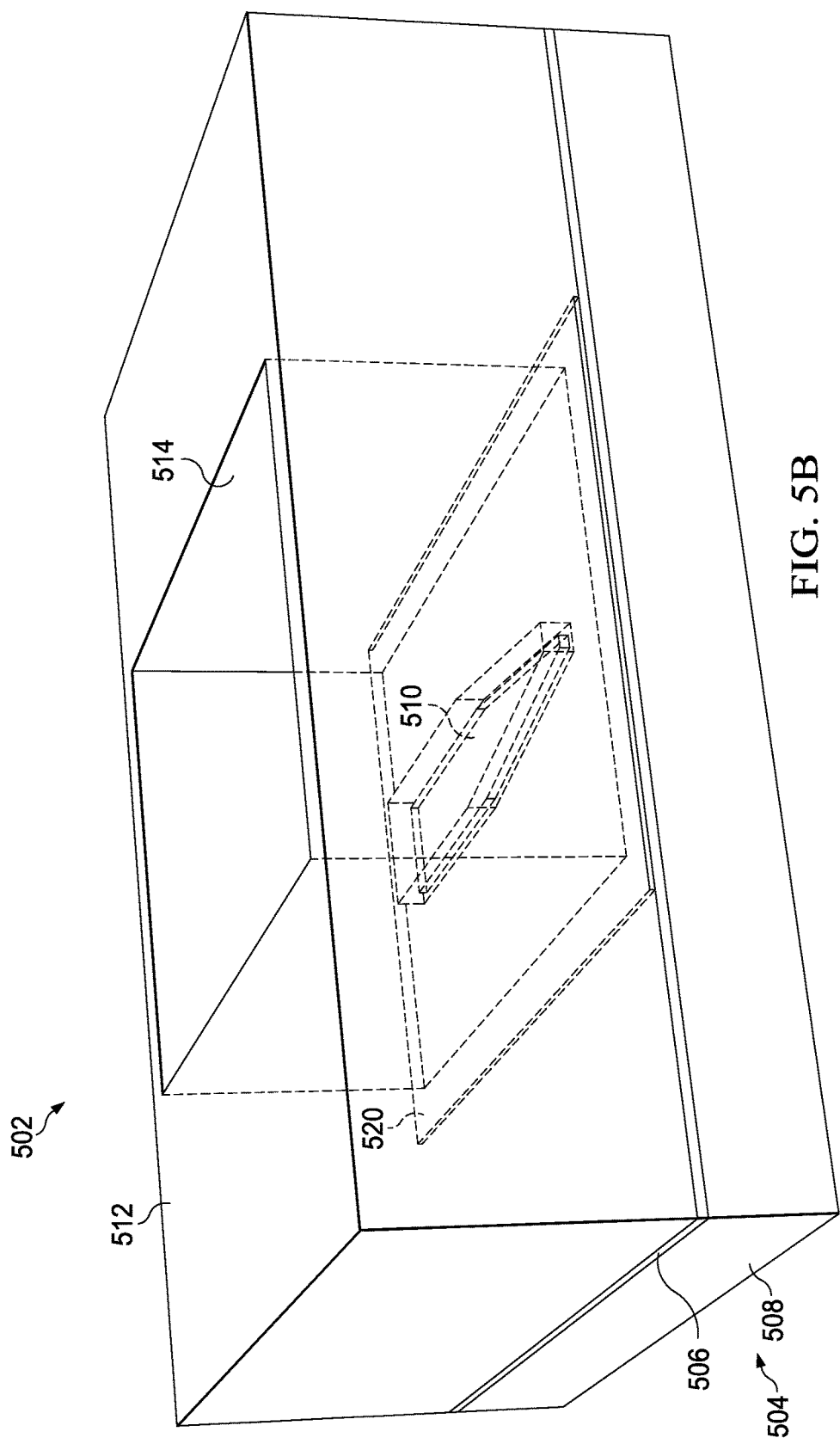
Figure 5C:
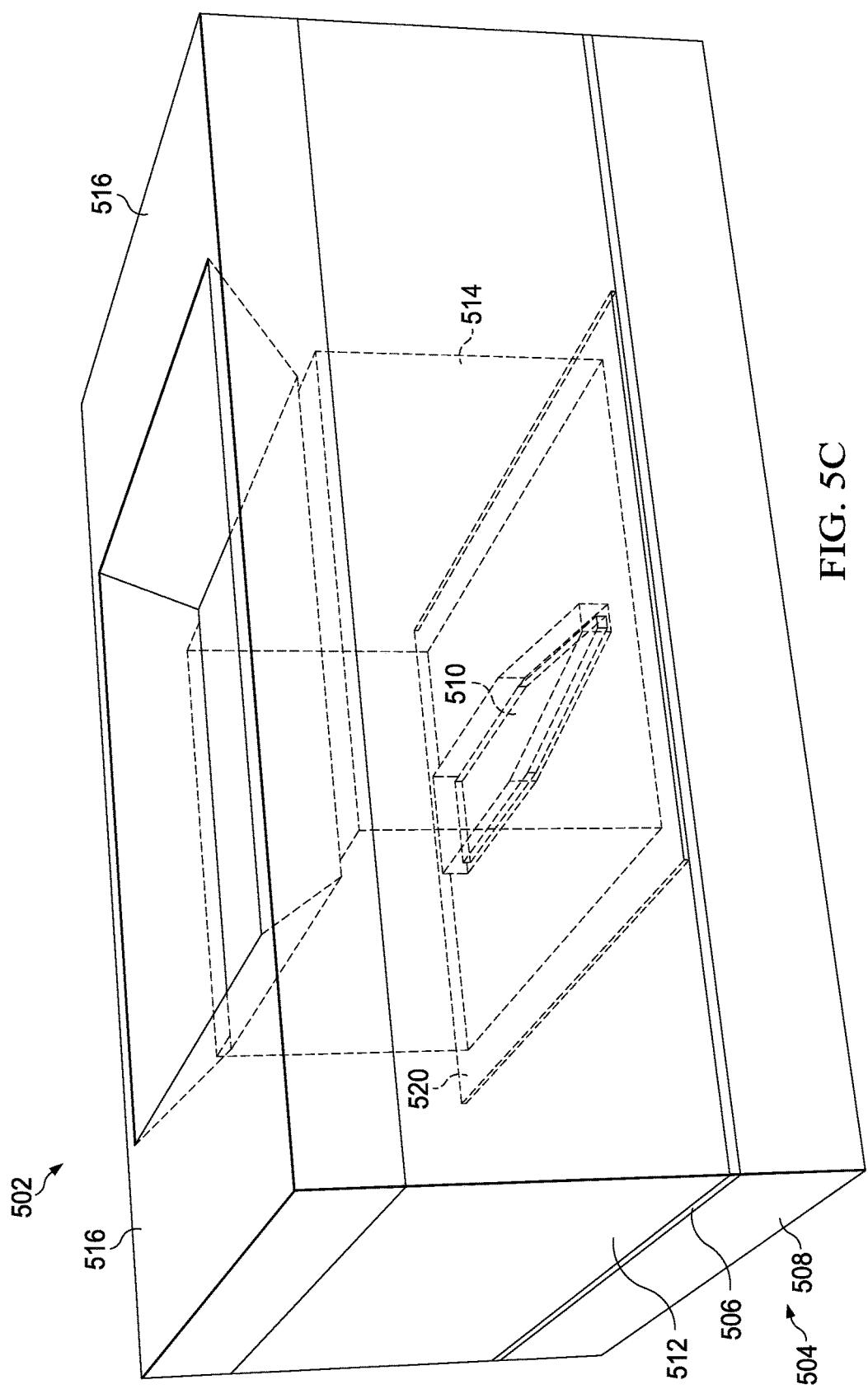
Figure 5D:
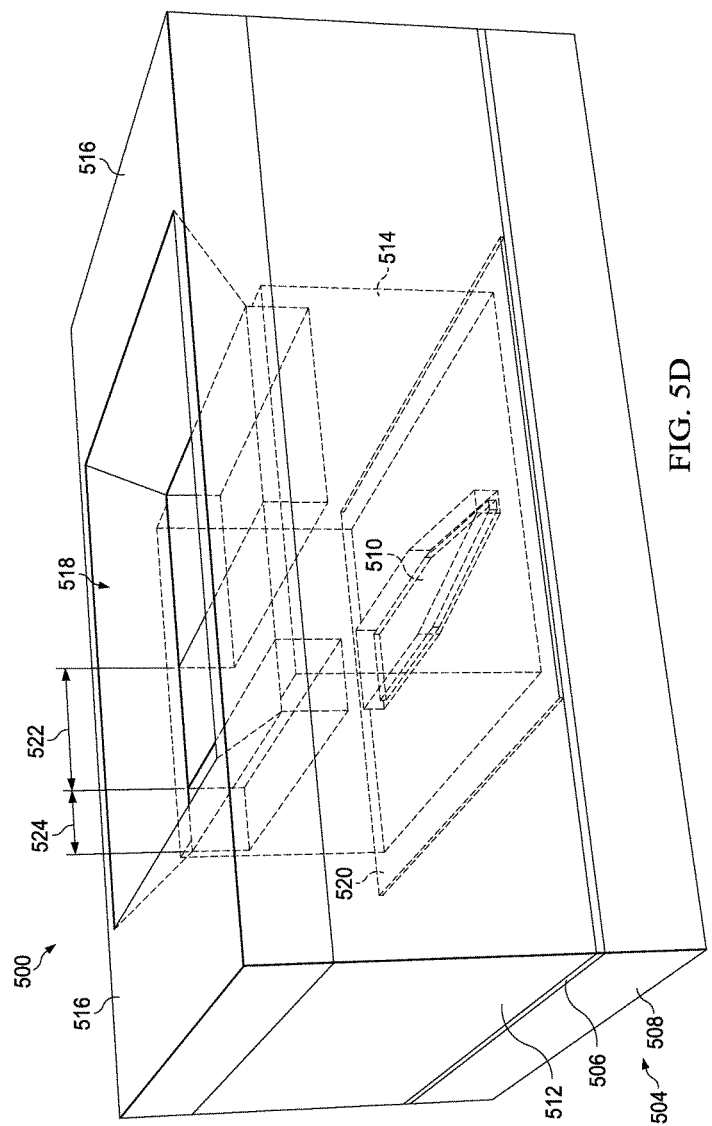

FIGS. 5A-5D collectively illustrate an embodiment of a method of fabricating an edge coupling device 500, the end result of which is depicted in FIG. 5D. The method and elements 500-520 illustrated in FIGS. 5A-5D are similar to the method and elements 400-420 illustrated in FIGS. 4A-4D. However, the edge coupling device 500 in FIG. 5D is initially an unsuspended structure.

As shown in FIG. 5A, a BOX layer 506 has been formed over a silicon semiconductor material 508 to form at least a portion of the substrate 504. The BOX layer 506 supports an inverse tapered silicon waveguide 510 covered by a silicon nitride etch stop layer 520. In an embodiment, the silicon nitride etch stop layer 520 initially overlies the entire wafer 502. However, the silicon nitride disposed outside the intended area shown in FIG. 5A is removed by, for example, boiling phosphorus acid or by another suitable removal process. Thereafter, a layer of silicon dioxide cladding material 512 is disposed over the silicon nitride etch stop layer 520.

Turning to FIG. 5B, a trench 514 having a width of approximately 400 μm is formed in the silicon dioxide cladding material 512 down to the etch stop layer 520 using a wet etch process. Thereafter, a silicon oxynitride or silicon oxide polymer layer 516 with a thickness of between about 3 μm to about 5 μm is deposited as shown in FIG. 5C. Then, the silicon oxynitride or silicon oxide polymer layer 516 is patterned to form the ridge waveguide 518 as shown in FIG. 5D. In an embodiment, a central portion 522 of the ridge waveguide 518 has width of about 3 μm to about 5 μm while lateral portions 524 of the ridge waveguide 518, which are adjacent to the central portion 522, each have a width of about 200 μm.

Figure 6:
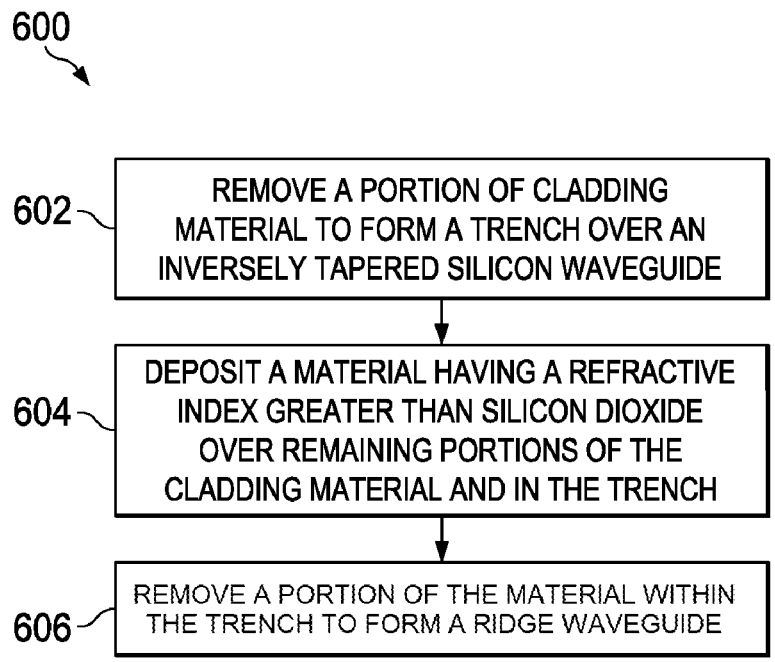
FIG. 6 is a flowchart illustrating a method of fabricating an edge coupling device according to an embodiment of the disclosure.

FIG. 6 is a flowchart illustrating a method 600 of fabricating an edge coupling device according to an embodiment of the disclosure. The method 600 may commence, for example, after a PIC device with at least one inverse taper (e.g., an inversely tapered waveguide 310, 410, 510) covered by cladding material (e.g., cladding material 312, 412, 512) has been accepted for further processing or fabrication. In block 602, a portion of the cladding material is removed to form a trench (e.g., trench 314, 414, 514) over the inversely tapered silicon waveguide. If an etch stop layer (e.g., etch stop layer 420, 520) is included in the PIC device, etching continues until the etch stop layer is reached. If an etch stop layer is not present, a timed etch may be performed.

In block 604, a material (e.g., high refractive index material 316, 416, 516) having a refractive index greater than silicon dioxide is deposited over remaining portions of the cladding material and in the trench. In block 606, a portion of the material within the trench is removed to form a ridge waveguide (e.g., ridge waveguide 318, 418, 518). While not shown or disclosed herein, it should be understood that further processing may thereafter take place as desired.

Figure 7:
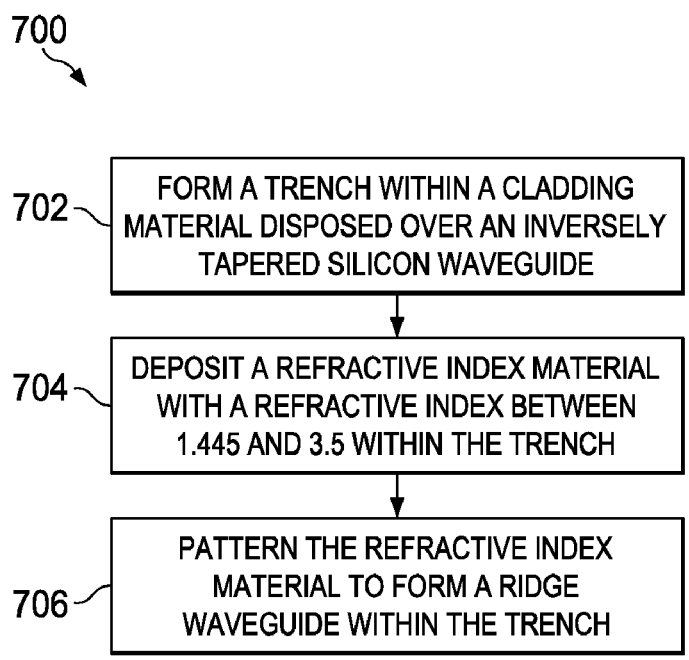
FIG. 7 is a flowchart illustrating a method of fabricating an edge coupling device according to an embodiment of the disclosure.

FIG. 7 is a flowchart illustrating a method 700 of fabricating an edge coupling device according to an embodiment of the disclosure. The method 700 may commence, for example, after a PIC device with at least one inverse taper (e.g., an inversely tapered waveguide 310, 410, 510) covered by cladding material (e.g., cladding material 312, 412, 512) has been accepted for further processing or fabrication. In block 702, a trench (e.g., trench 314, 414, 514) is formed within a cladding material disposed over the inversely tapered silicon waveguide. If an etch stop layer (e.g., etch stop layer 420, 520) is included in the PIC device, the trench may be formed by etching down to the etch stop layer. If an etch stop layer is not present, the trench may be formed through a timed etch.

In block 704, a refractive index material (e.g., high refractive index material 316, 416, 515) is deposited within the trench. In an embodiment, the refractive index material has a refractive index between about 1.445 and about 3.5. In block 706, the refractive index material is patterned to form a ridge waveguide (e.g., ridge waveguide 318, 418, 518) within the trench. While not shown or disclosed herein, it should be understood that further processing may thereafter take place as desired.

Based on the embodiments disclosed herein, one skilled in the art will appreciate that an optical mode may be transferred gradually from the silicon waveguide to the high-index material ridge waveguide as the width of the silicon waveguide narrows in the inverse taper. The final mode size of the edge coupling device may be mainly dependent on the size of the high-index material ridge waveguide. Fabrication of the edge coupling device does not negatively impact or influence the performance of components already fabricated on the silicon photonic wafer. The disclosed embodiments may provide for a larger mode size (e.g., 3 to 5 μm) than a simple inverse taper, a low coupling loss, an improved reliability compared to a suspended edge coupler because there may be no suspended structure, an improved fabrication tolerance because the minimum inverse taper width may be larger, and monolithic integration with other passive and active SOI components.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of fabricating an edge coupling device, comprising:
    removing a portion of cladding material to form a trench over an inversely tapered silicon waveguide;
    depositing a material having a refractive index greater than silicon dioxide over remaining portions of the cladding material and in the trench; and
    removing a portion of the material within the trench to form a ridge waveguide within the trench.

2. The method of claim 1, further comprising forming an etch stop layer over the inversely tapered silicon waveguide prior to removing the portion of the cladding material, and wherein the portion of the cladding material is removed by etching down to the etch stop layer.

3. The method of claim 2, further comprising removing the portion of the cladding material using a timed etch process.

4. The method of claim 1, further comprising removing the portion of the material within the trench using a photolithography process.

5. The method of claim 1, wherein the cladding material comprises a silicon dioxide layer.

6. The method of claim 1, wherein the cladding material comprises a silicon dioxide layer and at least one of silicon nitride layer and a silicon carbide layer.

7. The method of claim 1, wherein the refractive index of the material is less than a refractive index of silicon.

8. The method of claim 1, wherein the material is one of silicon nitride ($Si_3N_4$), silicon oxide (SiOx), silicon oxynitride (SiON), aluminum oxide ($Al_2O_3$), and aluminum nitride (AlN).

9. The method of claim 1, wherein a thickness of the material is between 2 micrometers (μm) and 20 μm.

10. The method of claim 1, wherein a width of the trench is greater than a width of the inversely tapered silicon waveguide, and wherein the width of the trench is greater than 5 μm.

11. The method of claim 1, wherein the ridge waveguide has a single-mode condition.

12. The method of claim 1, wherein the ridge waveguide is formed such that a ridge waveguide width is equivalent to a ridge waveguide height.

13. A method of fabricating an edge coupling device, comprising:
    forming a trench within a cladding material disposed over an inversely tapered silicon waveguide;
    depositing a refractive index material within the trench, wherein the refractive index material has a refractive index between 1.445 and 3.5; and
    patterning the refractive index material to form a ridge waveguide within the trench.

14. The method of claim 13, further comprising forming an etch stop layer over the inversely tapered silicon waveguide prior to forming the trench.

15. The method of claim 13, further comprising gradually transferring an optical mode from the inversely tapered silicon waveguide of the edge coupling device to the ridge waveguide as a width of the inversely tapered silicon waveguide narrows.

16. The method of claim 13, wherein a mode size of the edge coupling device corresponds to a size of the ridge waveguide, wherein the ridge waveguide has a single-mode condition, and wherein the mode size is between 3 micrometers (μm) and 10 μm.

17. The method of claim 13, further comprising monolithically integrating the edge coupling device with a silicon on insulator (SOI) device.

* * * * *